United States Patent
Hu et al.

(10) Patent No.: US 10,486,545 B2
(45) Date of Patent: Nov. 26, 2019

(54) SYSTEM FOR CONTROLLING POWERTRAIN OF AN ELECTRIC VEHICLE

(71) Applicant: NIO NEXTEV LIMITED, Hong Kong (CN)

(72) Inventors: Mingyin Hu, Shanghai (CN); Bin He, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 24 days.

(21) Appl. No.: 15/676,301

(22) Filed: Aug. 14, 2017

(65) Prior Publication Data

US 2018/0050608 A1 Feb. 22, 2018

(30) Foreign Application Priority Data

Aug. 19, 2016 (CN) .......................... 2016 1 0687930

(51) Int. Cl.
*B60L 15/20* (2006.01)

(52) U.S. Cl.
CPC .......... *B60L 15/20* (2013.01); *B60L 2240/42* (2013.01); *B60L 2240/62* (2013.01);
(Continued)

(58) Field of Classification Search
CPC .. B60L 15/20; B60L 2250/26; B60L 2240/62; B60L 2250/20; B60L 2240/66;
(Continued)

(56) References Cited

U.S. PATENT DOCUMENTS 10,176,524 B1 * 1/2019 Brandmaier ........... G06Q 40/08
2012/0074770 A1    3/2012 Lee
(Continued)

FOREIGN PATENT DOCUMENTS

CN        1759023       4/2006
CN      101661637      3/2010
(Continued)

OTHER PUBLICATIONS

International Search Report for International (PCT) Patent Application No. PCT/CN2017/088459, dated Sep. 12, 2017, 5 pages.

*Primary Examiner* — Anne M Antonucci
*Assistant Examiner* — Renee LaRose
(74) *Attorney, Agent, or Firm* — Sheridan Ross P.C.

(57) ABSTRACT

A system for controlling powertrain of an electric vehicle, comprising: a driver recognition module, configured for determining the identity information of the controlled vehicle's driver, and uploading the identity information to a backend computing unit; the backend computing unit, located at a remote end of the controlled vehicle, configured for generating a first control information based on the driver's identity information; an assist control module, configured for generating a second control information based on the information related to current driving of the controlled vehicle which is acquired from the backend computing unit; and a control information application module, integrated in the controlled vehicle, configured for applying the first and second control information to the powertrain of the controlled vehicle. Optimized control for powertrain is achieved and an excellent user experience is provided. The system can be implemented simply, and be updated and maintained conveniently.

16 Claims, 2 Drawing Sheets

(52) U.S. Cl.
CPC ..... *B60L 2240/642* (2013.01); *B60L 2240/66* (2013.01); *B60L 2240/68* (2013.01); *B60L 2250/20* (2013.01); *B60L 2250/26* (2013.01); *Y02T 10/645* (2013.01); *Y02T 10/7275* (2013.01); *Y02T 10/7291* (2013.01); *Y02T 90/16* (2013.01); *Y02T 90/162* (2013.01)

(58) Field of Classification Search
CPC ........... B60L 2240/642; B60L 2240/42; B60L 2240/68
See application file for complete search history.

(56) References Cited

U.S. PATENT DOCUMENTS

| 2013/0179007 A1* | 7/2013 | Dalum | H01M 16/006 |
| | | | 701/2 |
| 2015/0025727 A1* | 1/2015 | Engman | B60L 1/00 |
| | | | 701/22 |

FOREIGN PATENT DOCUMENTS

| CN | 201449449 | 5/2010 |
| CN | 102639376 | 8/2012 |
| CN | 103927848 | 7/2014 |
| CN | 104044535 | 9/2014 |
| CN | 104296762 | 1/2015 |
| CN | 104386063 | 3/2015 |
| CN | 105022777 | 11/2015 |
| CN | 105654753 | 6/2016 |
| FR | 2969357 | 6/2013 |
| JP | 2016-133868 | 7/2016 |

* cited by examiner

SYSTEM FOR CONTROLLING POWERTRAIN OF AN ELECTRIC VEHICLE

CROSS-REFERENCE TO RELATED APPLICATION

This application claims the benefit of China Patent Application No. 201610687930.8 filed Aug. 19, 2016, the entire contents of which are incorporated herein by reference.

FIELD OF INVENTION

The present invention relates to technical field of electric vehicles, and more particularly, to a system for controlling powertrain of an electric vehicle.

BACKGROUND

On the one hand, more and more productions of on-board communication module appear nowadays with the development of technology of internet of vehicles, implementing the communication interaction between a vehicle and a platform, and even among vehicles.

On the other hand, as one of the solutions for the problems regarding energy and environment, new energy technology is developing rapidly. Especially, the application of alternating current motors and high power batteries overcomes obstacles/difficulties for the electric vehicles and hybrid power vehicles to be popularized.

Comparing to a conventional vehicle, an electric vehicle is advantageous for having a greater short-term torque upon starting, however, due to the cooling problems faced with batteries and motors, the duration for the transient maximum power to be sustained may be shorter. Moreover, in the case of long distance driving, an electric vehicle is disadvantageous, as the electric power thereof may be insufficient and the resulting endurance capability may be poor. Hence, reasonable energy management is required to be applied thereon.

At present, in the prior art, some of electric vehicles are provided with a remote acquisition module, configured to perform uploading and analysis of the operating data of electric vehicles. However, the existing solutions neither optimize the powertrain control through data analysis, nor provide any useful assisting information related to driving.

Therefore, those skilled in the art hope to obtain a system for controlling powertrain of an electric vehicle that may overcome the above shortcomings.

SUMMARY OF INVENTION

One objective of the invention is to provide a system for controlling powertrain of an electric vehicle, the system is able to provide optimized control for the powertrain and provide assisting information related to driving as well.

To achieve the objective above, a technical solution is provided by the present invention as follows:

a system for controlling powertrain of an electric vehicle, comprising: a driver recognition module, for determining the identity information of a controlled vehicle's driver, and uploading the identity information to a backend computing unit; the backend computing unit, located at a remote end of the controlled vehicle, used for generating a first control information based on the driver's identity information; an assist control module, for generating a second control information based on information related to current driving of the controlled vehicle which is acquired from the backend computing unit; and a control information application module, integrated in the controlled vehicle, used for applying the first and second control information to the powertrain of the controlled vehicle.

Preferably, a driving data determination module is also comprised, the driving data determination module is integrated in the controlled vehicle, and configured for collecting driving data of the driver and uploading the driving data to the backend computing unit.

Preferably, the backend computing unit determines a driving type of the driver based on the driving data.

Preferably, the driving data comprises: times for the controlled vehicle to be accelerated urgently within a certain section of road and/or a certain period of time; times for the controlled vehicle to be decelerated urgently within a certain section of road and/or a certain period of time; and average speed of the controlled vehicle within a certain section of road and/or a certain period of time.

Preferably, the backend computing unit matches the driving type of the driver based on the driver's identity information, and generates the first control information based on the driving type of the driver.

Preferably, the first control information comprises: sensitivity of the accelerator pedal; torque response from the motor; and filtering time from actuating to braking energy feedback.

Preferably, the second control information is the correcting information for the first control information.

Preferably, the system further comprises a user appointing module, configured to instruct a vehicle control unit of the controlled vehicle to start and/or preheat the respective subcomponents and/or subunits of the controlled vehicle at an appointed time based on an appointment instruction from a user.

Preferably, the backend computing unit is set up on a cloud computing platform.

The system for controlling powertrain of an electric vehicle provided by various embodiments of the invention not only takes a full consideration of the driving preference of the driver, but also optimizes the solution for power distribution and/or heat management applied to the controlled vehicles according to various assisting information related to the current driving, so as to accomplish optimized control for the powertrain while providing an excellent user experience. The system may be implemented simply, and be upgraded and maintained conveniently.

DESCRIPTION OF EMBODIMENTS

Figure 1:
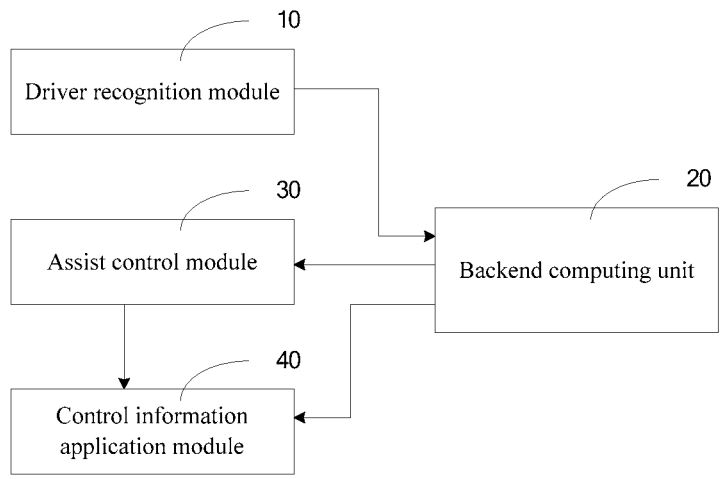
FIG. 1 shows a modular structure diagram of the system for controlling powertrain of an electric vehicle provided by a first embodiment of the invention.

As shown in FIG. 1, the first embodiment of the invention provides a system for controlling powertrain of an electric vehicle, the system comprises a driver recognition module 10, a backend computing unit 20, an assist control module 30 and a control information application module 40.

In general, the driver recognition module 10, the assist control module 30, and the control information application module 40 are integrated within the controlled vehicle. The backend computing unit 20 is located at a remote end of the controlled vehicle.

In particular, the driver recognition module 10 may determine the identity information of the controlled vehicle's driver, and uploading this identity information to the backend computing unit 20. The backend computing unit 20 generates a first control information based on the identity information of the driver. The assist control module 30 acquires information related to current driving of the controlled vehicle from the backend computing unit 20, and generates a second control information based on the related information. The control information application module 40 applies the first and the second control information to the powertrain of the controlled vehicle, so as to accomplish the control or adjustment for the power output of the controlled electric vehicle.

As stated above, the driver recognition module 10 is used for determining the identity information of the controlled vehicle's driver. It can be understood that different drivers may have different driving styles and driving habits respectively. Even when driving on the same section of road, there may also be considerable difference between the driving styles of the drivers. According to the present invention, the driving preference of a driver can be determined based on the identity information of the driver.

According to one embodiment of the invention, drivers are classified into different types, for example, including an aggressive driver, a moderate driver, an ordinary driver, and so on. On the basis of the classification, in order to fully consider the driving preferences of different type of drivers and meanwhile take account of driving safety, the backend computing unit 20 receives the output of the driver recognition module 10, so as to learn the type (driving preference) of the driver, and accordingly generates the first control information and output it to the control information application module 40. The first control information may represent a driving setting suitable for the driver, and in particular can be embodied as the control applied to the powertrain such as the accelerator pedal and the motor torque, etc., so that the driver may feel an excellent controllability of the controlled vehicle while driving, and obtain an impressive user experience accordingly.

To determine the driving preference of the driver via the identity information of the driver, the backend computing unit 20 may set up a driver's information database, in which the correspondence between the identity information and the driving preference of the drivers are recorded. The driver's information database may be derived from history data, or may also be derived from other external inputs.

As an example, the first control information may include, but not limited to, sensitivity of the accelerator pedal; torque response from the motor; and filtering time from actuating to braking energy feedback. Wherein, the torque response from the motor refers to the torque of the motor responding to the accelerator pedal, the filtering time from actuating to braking energy feedback refers to the switching transition time during transiting from actuating to braking.

As a particular implementation, the driver recognition module 10 may be a smart phone, the driver sends a driving request to the backend computing unit 20 by using the smart phone he carried, the driving request may comprises: the identity information of the driver; and destination information. The backend computing unit 20 may uniquely determine the driver's identity by use of the phone number or the identification code of the smart phone. The backend computing unit 20 may also determine information of driving mileage and optimized path by use of the destination information.

Alternatively, the driver recognition module 10 may be a face recognition unit, which determines the driver's identity by taking photo of the driver's face.

As stated above, the assist control module 30 generates the second control information based on the information related to current driving of the controlled vehicle.

As an example, the information related to current driving of the controlled vehicle includes: vehicle's location; road traffic condition; destination mileage; and optimized path.

It may be understood by one of ordinary skill in the art that, as a backend system, the backend computing unit 20 may obtain various assisting information from an external system (e.g., a GPS system, a city traffic monitoring system), including the vehicle's location, whether or not the road ahead is congested, some other available paths and so on, and transmit these information to the assist control module 30.

As a preferred embodiment, the information related to current driving of the controlled vehicle further includes: gradient information of the next section of road; speed limit information of the next section of road; information of road pavement; and information of current weather. Herein, the information of road pavement represents a classification of road pavement, such as blacktop, cement, gravel, etc. The information of current weather includes rainy and/or snowy, sunny, etc. Learning the speed limit information may prevent the driver from exceeding the speed limit.

The management mechanism of the backend computing unit 20 may divide various sections of roads within a certain city into different types according to the information of gradient and speed limit, so that "the information related to current driving of the controlled vehicle" herein may be capable of reflecting the condition of road ahead.

By use of various information above, the assist control module 30 may obtain a prediction of current traffic and/or road pavement condition, and employ corresponding models for the traffic and/or road according to the current traffic and/or the road pavement condition, to generate the respective second control information, and thus control the motor output of the electric vehicle and/or distribute the power of the battery via the control information application module 40, so as to improve the endurance capability as high as possible with the existing energy of the electric vehicle while providing enough output power. For example, it may be possible that a first power allocation solution is suitable for a first type of road section, and a second power allocation solution is suitable for a second type of road section, etc.

It can be understood that, by use of those information about the gradient of the road section and the average vehicle speed, etc., the assist control module 30 may predict power needs within a future period of time, adjust the long term capability as well as the short term capability of the motor and the battery. If the power needs within a future period of time is predicted to be lower, the motor and the battery may be allocated with a short term capability, and if the power needs within a future period of time is predicted to be higher, the motor and the battery may be allocated with a long term capability. In this manner, the inconsistence of driving experience caused by the conflict between the long term capability and short term capability of the battery and the motor may be avoided, and the overheat of the motor and the battery may be avoided meanwhile.

In addition, the response of a heat management system for electric vehicle is generally slow due to its own characteristics. By use of various information as mentioned above, a "prejudgment" for a heat management solution may be accomplished. If the future power needs is predicted to be higher, the heat management system may be adapted for the future power growth in advance, by way of increasing the throughput, increasing the rotation speed of the fan and the compressor in advance to improve heat radiation; and if the future power needs is predicted to be lower, the heat management system may be adapted for saving energy, by way of reducing throughput, reducing the rotation speed of the fan and the compressor, so as to accomplish the effect of optimizing heat management.

Based on the first embodiment above, the second control information may serve as the correcting information for the first control information. At this time, the assist control module 30 may output the second control information to the control information application module 40, and after the control information application module 40 combines the first control information with the second control information, a particular control instruction is generated and applied to the powertrain of the controlled vehicle. Alternatively, the second control information may also be output directly to the vehicle control unit (VCU) of the electric vehicle, and the vehicle control unit (VCU) may implement control for the powertrain.

As an example, the control information application module 40 may be embodied as a part of or a component of the vehicle control unit (VCU), and may also be independent of the vehicle control unit (VCU). For the convenience of operating, the control information application module 40 may connect and communicate with the vehicle control unit (VCU) via bus, a control instruction may be generated and transmitted to the vehicle control unit (VCU) by the control information application module 40. Subsequently, the vehicle control unit (VCU) analyzes the control instruction and is responsible for controlling the powertrain.

Figure 2:
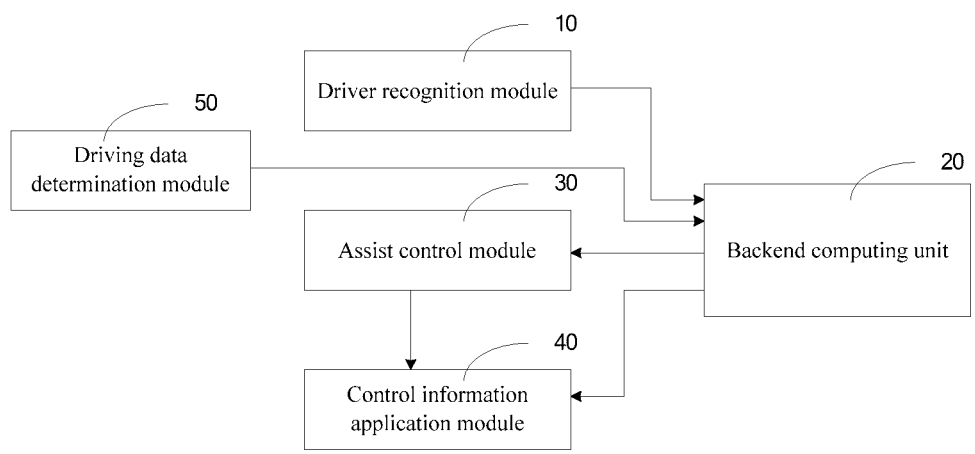
FIG. 2 shows a modular structure diagram of the system for controlling powertrain of an electric vehicle provided by a second embodiment of the invention.

As shown in FIG. 2, the second embodiments of the invention provides a system for controlling powertrain of an electric vehicle, which comprises a driver recognition module 10, a backend computing unit 20, an assist control module 30, a control information application module 40, and a driving data determination module 50.

Herein, the logical relationship between the driver recognition module 10, the backend computing unit 20, the assist control module 30, and the control information module 40 and the respective functions thereof are similar to those of the first embodiment. The driving data determination module 50 is integrated in the controlled vehicle, which is used for collecting a driving data of the driver and uploading the driving data to the backend computing unit 20.

The driving data collected by the driving data determination module 50 may comprise: the times for the controlled vehicle to be accelerated urgently within a certain section of road and/or a certain period of time; the times for the controlled vehicle to be decelerated urgently within a certain section of road and/or a certain period of time; and the average speed of the controlled vehicle within a certain section of road and/or a certain period of time. The backend computing unit 20 determines the driving type (driving preference) of the driver based on the driving data. The backend computing unit 20 may also take other factors into account when determining the driving type of the driver, for example, whether the driver has a bad driving record, the age, sex, and physical condition of the driver.

As a particular implementation, the driving data determination module 50 collects and uploads the driving data of the driver in real time, for example, signals such as position of the accelerator pedal, position of the brake pedal, speed of the vehicle. The driving data is then uploaded directly or via a communication module of the controlled vehicle by the driving data determination module 50 to the backend computing unit 20. The collected data of each user is analyzed by the backend computing unit 20, the driving characteristics of different user is obtained, and an exclusive marking file (a first control information) that best fits this driver is calculated. When the driver uses the vehicle again, the exclusive marking file (the first control information) thereof is loaded via a TCU on the control information application module 20, or loaded directly onto a VCU, so that a more suitable and customized driving experience is provided for the driver based on his/her driving preferences.

The backend computing unit 20 may recognize and distinguish the driver by reading the ID information of the cell phone, identifying the user (driver) by reading the ID code of the cell phone. After the user is identified, the backend computing unit 20 collects statistics with regard to the driving characteristics of the user, for example, including: the proportion of urgent acceleration, the proportion of urgent deceleration, the average speed, the application range of SOC, and whether coasting exists, within a certain section of road and/or a certain period of time. The driving characteristics of the user may be classified into aggressive, moderate, ordinary, sluggish and so on based on the proportion of urgent acceleration, the proportion of urgent deceleration, and the relative average speed. The driving characteristics of the user may be classified into regular and irregular based on whether there coasting exists, and the times of overcharge/discharge.

In a preferred embodiment, the backend computing unit 20 may be embodied as a distributed system, and be set up on a cloud computing platform, so as to facilitate user access and acquiring external data, resulting in convenience for the system to be updated and maintained. The backend computing unit 20 may be communicatively coupled with a plurality of controlled vehicles, so as to achieve a one-to-many control mode.

Figure 3:
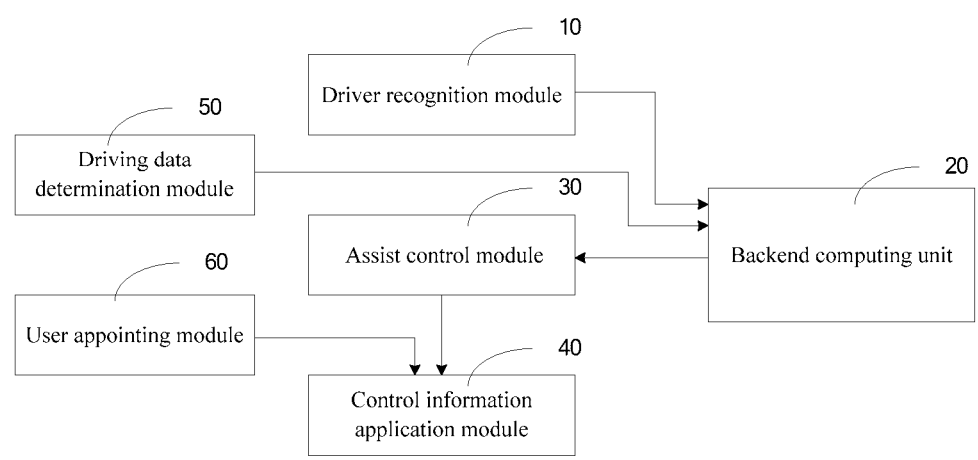
FIG. 3 shows a modular structure diagram of the system for controlling powertrain of an electric vehicle provided by a third embodiment of the invention.

As shown in FIG. 3, the third embodiment of the invention, being an improved form of the second embodiment above, further comprises a user appointing module 60, which instructs the control information application module 40 to start and/or preheat the respective subcomponents and/or subunits of the controlled vehicle at a appointed time based on the appointing instruction of the user (driver).

Upon the user appointing module 60 being introduced, before a user departs, a appointing request may be sent directly to the control information application module 40 (as shown in FIG. 3), the time for departure may be appointed via the backend computing unit 20, and then the control information application module 40 is notified by the backend computing unit 20 (not shown in FIG. 3). After the appointing request is received by the control information application module 40, VCU is wakened up. After the wakening signal is received by the VCU, the powertrain controller is wakened up, the high-voltage relay is closed, and the functionalities such as preheating of the powertrain system and a high-voltage air conditioner, etc. are supported.

As a further improvement, during vehicle travelling, the control information application module 40 may collect data from the powertrain, upload current operating parameters in real time onto the backend computing unit 20, such as vehicle speed, torque output, power output, etc., and report all malfunction information, for example, single cell failures, battery temperature sensor failures, the battery temperature, motor temperature sensor failures, and the motor temperature. The backend computing unit 20 may analyze the received information and derive an overall health condition of the vehicle, and remind the user to maintain the vehicles as appropriate.

In addition, when the vehicle is in parking state, the control information application module 40 may transmit the status information of the powertrain, such as an SOC of the battery, health condition of the battery, health condition of the motor, battery temperature, to the backend computing unit 20. The received information may be used by the backend computing unit 20 to diagnose the vehicle, and provide the user with real-time diagnosing information and a suggestion for maintenance.

The system for controlling powertrain of an electric vehicle provided by the various embodiments of the invention, on the one hand, fully considers the driving preference of the driver, and on the other hand, optimizes the solution of power distribution and/or heat management of the controlled vehicle based on various assisting information related to current driving, so that optimized control for the powertrain can be accomplished and an excellent user experience can be obtained.

Moreover, the various systems for controlling powertrain of an electric vehicle as provided above may be implemented simply and be updated and maintained conveniently. The present invention provides an advanced and valuable solution for modernizing the traffic management of metropolis.

The description above is merely directed to the preferred embodiments of the invention, rather than to limit the protected scope of the invention. Those skilled in the art may devise various modified designs, without departing from the concept and the appended claims of the invention.

What is claimed is:

1. A system for controlling powertrain of an electric vehicle, comprising:
    a driver recognition module for determining identity information of a controlled vehicle's driver and uploading the identity information to a backend computing unit;
    the backend computing unit located at a remote end of the controlled vehicle, used for generating a first control information based on the driver's identity information;
    an assist control module for generating a second control information based on information related to current driving of the controlled vehicle which is acquired from the backend computing unit;
    a control information application module integrated in the controlled vehicle, used for applying the first and second control information to the powertrain of the controlled vehicle; and
    a driving data determination module integrated in the controlled vehicle, used for collecting driving data of the driver and uploading the driving data to the backend computing unit, wherein the driving data comprises:
        times for the controlled vehicle to be accelerated urgently within a certain section of road and/or a certain period of time;
        times for the controlled vehicle to be decelerated urgently within a certain section of road and/or a certain period of time; and
        average speed of the controlled vehicle within a certain section of road and/or a certain period of time; and
    wherein, the backend computing unit determines a driving type of the driver based on the driving data.

2. The system according to claim 1, wherein, the backend computing unit matches the driving type of the driver based on the driver's identity information, and generates the first control information based on the driving type of the driver.

3. The system according to claim 1, wherein, the driver recognition module is a smart phone, the driver sends a driving request to the backend computing unit by using the smartphone, the driving request comprises:
    the driver's identity information; and/or
    destination information.

4. The system according to claim 1, wherein, the system further comprises a user appointing module, configured to instruct the control information application module to start and/or preheat the respective subcomponents and/or subunits of the controlled vehicle at an appointed time based on an appointment instruction from a user.

5. The system according to claim 1, wherein, the backend computing unit is set up on a cloud computing platform.

6. The system according to claim 1, wherein, the backend computing unit is communicatively coupled with a plurality of the controlled vehicles.

7. The system according to claim 1, wherein, the first control information comprises:
    sensitivity of the accelerator pedal;
    torque response from the motor; and
    filtering time from actuating to braking energy feedback.

8. The system according to claim 1, wherein, the information related to the current driving of the controlled vehicle comprises:
    the vehicle's location;
    road traffic condition;
    destination mileage; and
    optimized path.

9. The system according to claim 8, wherein, the information related to the current driving of the controlled vehicle further comprises:
    gradient information of the next section of road;
    speed limit information of the next section of road;
    information of road pavement; and
    information of current weather.

10. The system according to claim 1, wherein, the second control information is the correcting information for the first control information.

11. A method for controlling powertrain of an electric vehicle, comprising:
    determining identity information of a controlled vehicle's driver and uploading the identity information to a backend computing unit, the backend computing unit being located at a remote end of the controlled vehicle and used for generating a first control information based on the driver's identity information;
    generating, by an assist control module, a second control information based on information related to current driving of the controlled vehicle which is acquired from the backend computing unit;
    applying, by a control information application module integrated in the controlled vehicle, the first and second control information to the powertrain of the controlled vehicle;
    collecting, by a driving data determination module integrated in the controlled vehicle, driving data of the driver and uploading the driving data to the backend computing unit, wherein the driving data comprises:

times for the controlled vehicle to be accelerated urgently within a certain section of road and/or a certain period of time;

times for the controlled vehicle to be decelerated urgently within a certain section of road and/or a certain period of time; and average speed of the controlled vehicle within a certain section of road and/or a certain period of time, and wherein a driving type of the driver is determined by the backend computing unit based on the driving data.

12. The method according to claim 11, wherein, the driving type of the driver is determined by the backend computing unit based on the driver's identity information, and the first control information is generated by the backend computing unit based on the driving type of the driver.

13. The method according to claim 11, wherein, the first control information comprises:

sensitivity of the accelerator pedal;

torque response from the motor; and filtering time from actuating to braking energy feedback.

14. The method according to claim 11, wherein, the information related to the current driving of the controlled vehicle comprises:

the vehicle's location;

road traffic condition;

destination mileage; and optimized path.

15. The method according to claim 11, wherein, the information related to the current driving of the controlled vehicle further comprises:

gradient information of the next section of road;

speed limit information of the next section of road;

information of road pavement; and information of current weather.

16. A system for controlling powertrain of an electric vehicle, comprising:

a driver recognition module for determining identity information of a controlled vehicle's driver and uploading the identity information to a backend computing unit;

the backend computing unit located at a remote end of the controlled vehicle, used for generating a first control information based on the driver's identity information;

an assist control module for generating a second control information based on information related to current driving of the controlled vehicle which is acquired from the backend computing unit;

a control information application module integrated in the controlled vehicle, used for applying the first and second control information to the powertrain of the controlled vehicle;

a driving data determination module integrated in the controlled vehicle, used for collecting driving data of the driver and uploading the driving data to the backend computing unit, wherein the backend computing unit determines a driving type of the driver based on the driving data; and a user appointing module, configured to instruct the control information application module to start and/or preheat the respective subcomponents and/or subunits of the controlled vehicle at an appointed time based on an appointment instruction from a user.

* * * * *